United States Patent [19]

Keil

[11] 4,087,478
[45] May 2, 1978

[54] SILOXANE COPOLYMERS AND THREAD FINISHER PREPARED THEREWITH

[75] Inventor: Joseph W. Keil, Midland, Mich.

[73] Assignee: Dow Corning Corporation, Midland, Mich.

[21] Appl. No.: 676,825

[22] Filed: Apr. 14, 1976

[51] Int. Cl.$^2$ .............................................. C08L 43/04
[52] U.S. Cl. ............................ 260/825; 260/29.1 SB; 260/46.5 R; 260/46.5 G
[58] Field of Search ........... 260/29.1 SB, 825, 46.5 R, 260/46.5 G

[56] References Cited

U.S. PATENT DOCUMENTS

| | | | |
|---|---|---|---|
| 3,202,542 | 8/1965 | Poje | 260/29.1 SB |
| 3,231,532 | 1/1966 | Modic | 260/29.1 SB |
| 3,294,737 | 12/1966 | Krantz | 260/825 |
| 3,819,745 | 6/1974 | Plante | 260/825 |

Primary Examiner—Hosea E. Taylor
Assistant Examiner—A. B. Yarbrough
Attorney, Agent, or Firm—Jack E. Moermond

[57] ABSTRACT

A copolymeric reaction product consisting essentially of (A) 60 to 95 percent by weight of a resin consisting essentially of 45 to 72 mole percent SiO$_2$ units and 28 to 55 mole percent (CH$_3$)$_3$SiO$_{1/2}$ units, and (B) 5 to 40 percent by weight of a resin consisting essentially of 60 to 100 mole percent RSiO$_{3/2}$ units, 0 to 35 mole percent R$_2$SiO units and 0 to 5 mole percent R$_3$SiO$_{1/2}$ units, each R radical being independently selected from the group consisting of the methyl, propyl and phenyl radicals, is disclosed. These siloxane copolymers can be combined with a trimethylsilyl endblocked polydimethylsiloxane fluid and conventional organic thread finishes to obtain thread treating compositions.

20 Claims, No Drawings

SILOXANE COPOLYMERS AND THREAD FINISHER PREPARED THEREWITH

Thread finishes comprising organic materials and silicones have been difficult to prepare because of the inherent incompatibility of the two materials. Also, application of the neat finish has been very difficult if not impossible because of incompatibility.

It is an object of this invention to provide a composition comprising a stable dispersion of an organic material and a silicone.

Another object of this invention is to provide a process for finishing thread whereby the desirable properties of organic materials and silicones can be imparted to the thread in a single operation.

A further object of this invention is to provide a dispersing agent which is particularly useful in the preparation of thread finishes.

Trimethylsilyl endblocked polydimethylsiloxane fluids are often used with modern high speed sewing equipment because they provide good lubricity, have excellent heat resistance and prevent heat degradation of synthetic threads. Organic materials are normally added to threads to provide good protection against chatter and static buildup. Attempts to apply the siloxane fluids and organic materials to the thread simultaneously have left much to be desired because the dispersions employed tend to be unstable due to the inherent incompatibility of the siloxane fluids and the organic materials.

A process for finishing thread has been discovered which consists of applying to the thread a composition which consists essentially of (I) 2 to 5 percent by weight of a copolymeric reaction product of (A) 60 to 95 percent by weight of a resin consisting essentially of 45 to 72 mole percent $SiO_2$ units and 28 to 55 mole percent $(CH_3)_3SiO_{1/2}$ units, and (B) 5 to 40 percent by weight of a resin consisting essentially of 60 to 100 mole percent $RSiO_{3/2}$ units, 0 to 35 mole percent $R_2SiO$ units and 0 to 5 mole percent $R_3SiO_{1/2}$ units, each R radical being independently selected from the group consisting of the methyl, propyl and phenyl radicals, (II) 45 to 68 percent by weight of trimethylsilyl endblocked polydimethylsiloxane fluid, and (III) 30 to 50 percent by weight of an organic thread finish material.

This invention also relates to a composition which consists essentially of (I) 2 to 5 percent by weight of a copolymeric reaction product of (A) 60 to 95 percent by weight of a resin consisting essentially of 45 to 72 mole percent $SiO_2$ units and 28 to 55 mole percent $(CH_3)_3SiO_{1/2}$ units, (B) 5 to 40 percent by weight of a resin consisting essentially of 60 to 100 mole percent $RSiO_{3/2}$ units, 0 to 35 mole percent $R_2SiO$ units and 0 to 5 mole percent $R_3SiO_{1/2}$ units, each R radical being independently selected from the group consisting of the methyl, propyl and phenyl radicals, (II) 45 to 68 percent by weight of trimethylsilyl endblocked polydimethylsiloxane fluid, and (III) 30 to 50 percent by weight of an organic thread finish material.

This invention further relates to a dispersing agent which is a copolymeric reaction product of (A) 60 to 95 percent by weight of a resin consisting essentially of 45 to 72 mole percent $SiO_2$ units and 28 to 55 mole percent $(CH_3)_3SiO_{1/2}$ units, and (B) 5 to 40 percent by weight of a resin consisting essentially of 60 to 100 mole percent $RSiO_{3/2}$ units, 0 to 35 mole percent $R_2SiO$ units and 0 to 5 mole percent $R_3SiO_{1/2}$ units, each R radical being independently selected from the group consisting of the methyl, propyl and phenyl radicals.

Resins (A) and (B) used in making the dispersing agent of this invention can be made by techniques well known to those skilled in the art as well as being commercially available. The copolymeric reaction product of (A) and (B) is prepared by adding a xylene solution of (A) and solid (B) to the reaction vessel, then adding alcoholic KOH and heating the mixture while agitating. The mixture is then cooled, the KOH neutralized with $CO_2$ or an acid clay, and then the copolymeric reaction product is normally filtered before use.

Dispersing agent (I) as prepared above can be used directly to form stable dispersions of siloxane fluid (II) and organic thread finish (III). However, it is believed best at this time to first form a mixture of dispersing agent (I) and siloxane fluid (II) before mixing with organic thread finish (III). The mixture of dispersing agent (I) and siloxane fluid (II) is best accomplished by slowly adding the dispersing agent to the siloxane fluid with good mixing. The resulting mixture of dispersing agent (I) and siloxane fluid (II) can then be mixed with organic thread finish (III). The final dispersion containing the dispersing agent, siloxane fluid and organic thread finish depends to a degree on particle size for its stability. Thus, to obtain the most stable dispersions it is generally best to utilize a high shear mixer, such as an Eppenbach mixer, when preparing the dispersion containing dispersing agent (I), siloxane fluid (II) and organic thread finish (III). However, it is noted that adequate dispersions for many uses can be prepared in accordance with this invention using propeller mixers.

The trimethylsilyl endblocked polydimethylsiloxane fluids useful herein as well known materials. Generally speaking, the siloxane fluids used in the compositions of this invention should have a viscosity in the range of 20 to 1000 centistokes at 25° C. Preferably the siloxane fluid has a viscosity in the range of about 100 to 350 cs.

There are many organic thread finish materials that can be employed in the compositions of this invention. For example, the organic thread finish can be a polyalkylene glycol, a surfactant, an antistatic agent or a flame retardant. Other broad classes or organic thread finishes which can be employed herein will be apparent to those skilled in the art from these teachings. Specific examples of organic thread finishes useful in this invention include stearic acid, polyethylene glycols, polypropylene glycols, hydrogenated glycerides (fatty glycerides), alkylene glycol esters such as dimethylene glycol stearate and polyethylene glycol monostearate, polyoxyalkylene fatty amines such as polyoxyalkylene fatty amine, and chlorinated and brominated phosphates such as tris(2,3-dibromopropyl)phosphate, bis(dibromophenyl)phosphate and di(2,3-dibromopropyl)tribromophenyl phosphate.

Once the thread treating composition of this invention has been formulated it can be applied to the thread by any of the techniques well known to those skilled in the art. For example, the composition can be applied to the thread by spraying, wiping, padding or dipping. A common method is the application of the neat finish to the individual threads by means of a kiss roll rotating in a trough containing the finish. If the finish is a solid at room temperature it is heated to melt it for application. The amount of the composition applied should be sufficient to deposit from 0.1 to 10 percent by weight of finish, based on the weight of the thread. Preferably from 0.25 to 5 percent by weight of finish is left on the thread after treatment.

The compositions of this invention can be applied to any synthetic thread. By way of illustration these compositions can be applied to glass, viscose rayon, cuprammonium rayon, saponified cellulose acetate, alginate, cellulose nitrate, cellulose acetate, polyamide acrylic, modacrylic, polyvinyl, polyvinylidene, polyester, polycarbonate, polyolefin, polyurethane or fluorocarbon threads.

Now in order that those skilled in the art may better understand how the present invention can be practiced, the following examples are given by way of illustration and not by way of limitation.

All parts and percents referred to herein are by weight and all viscosities measured at 25° C. unless otherwise specified.

EXAMPLE 1

To a 500 ml. flask equipped with a Dean Stark trap, condenser, thermometer, stirrer and nitrogen sweep there was added 71.08 g. of xylene and 118.72 g. of a xylene solution of a resin (about 75.8% resin solids) consisting essentially of about 53 mole percent $SiO_2$ units and about 47 mole percent $(CH_3)_3SiO_{1/2}$ units. This mixture was heated to reflux temperature and held there for one (1) hour to remove water. The mixture was then cooled slightly and 10 g. of a resin consisting essentially of about 70 mole percent $C_6H_5SiO_{3/2}$ units and about 30 mole percent $C_3H_7SiO_{3/2}$ units added, with stirring, until dissolved. Then 0.2 g. of 1N alcoholic KOH was added to neutralize any residual acidity from the first resin employed. The flask contents were then refluxed for about 8 hours to obtain a 49% solids solution of a reaction product consisting essentially of (A) about 90 percent of the first resin and (B) about 10 percent of the second resin added.

To 188 g. of a trimethylsilyl endblocked fluid having a viscosity of about 100 cs. there was added, with stirring, from a syringe pump at the rate of 40 ml. per hour, 12.6 of the above prepared reaction product solution to obtain a composition which consisted essentially of (I) about 6 percent of a copolymeric reaction product of (A) about 90 percent of a resin consisting essentially of about 53 mole percent $SiO_2$ units and about 47 mole percent of $(CH_3)_3SiO_{1/2}$ units and (B) about 10 percent of a resin consisting essentially of about 70 mole percent $C_6H_5SiO_{3/2}$ units and about 30 mole percent $C_3H_7SiO_{3/2}$ units, and (II) about 94 percent of a trimethylsilyl endblocked polydimethylsiloxane fluid.

EXAMPLE 2

A reaction product was prepared (by the general process of Example 1) which consisted essentially of (A) about 85 percent of a resin consisting essentially of about 53 mole percent $SiO_2$ units and about 47 mole percent $(CH_3)_3SiO_{1/2}$ units, and (B) about 15 percent of a resin consisting essentially of about 70 mole percent $C_6H_5SiO_{3/2}$ units and about 30 mole percent $C_3H_7SiO_{3/2}$ units.

EXAMPLE 3

A reaction product was prepared (by the general process of Example 1) which consisted essentially of (A) about 95 percent of a resin consisting essentially of about 53 mole percent $SiO_2$ units and about 47 mole percent $(CH_3)_3SiO_{1/2}$ units, and (B) about 5 percent of a resin consisting essentially of about 70 mole percent $C_6H_5SiO_{3/2}$ units and about 30 mole percent $C_3H_7SiO_{3/2}$ units.

EXAMPLE 4

A reaction product was prepared which consisted essentially of (A) about 60 percent of a resin consisting essentially of about 53 mole percent $SiO_2$ units and about 47 mole percent of $(CH_3)_3SiO_{1/2}$ units, and (B) about 40 percent of a resin consisting essentially of about 47 mole percent $CH_3SiO_{3/2}$ units, about 23.5 mole percent $C_6H_5SiO_{3/2}$ units, and about 29.5 mole percent $(C_6H_5)_2SiO$ units.

EXAMPLE 5

A reaction product was prepared which consisted essentially of (A) about 85 percent of a resin consisting essentially of about 53 mole percent $SiO_2$ units and about 47 mole percent of $(CH_3)_3SiO_{1/2}$ units, and (B) about 15 mole percent of a resin consisting essentially of about 47 mole percent $CH_3SiO_{3/2}$ units, about 23.5 mole percent $C_6H_5SiO_{3/2}$ units, and about 29.5 mole percent $(C_6H_5)_2SiO$ units.

EXAMPLE 6

A reaction product was prepared which consisted essentially of (A) about 90 percent of a resin consisting essentially of about 53 mole percent $SiO_2$ units and about 47 mole percent $(CH_3)_3SiO_{1/2}$ units, and (B) about 10 percent of a resin consisting essentially of about 88 mole percent $CH_3SiO_{3/2}$ units and about 12 mole percent $(CH_3)_2SiO$ units.

EXAMPLE 7

Premixes were prepared which consisted essentially of (I) 6% of the above prepared copolymeric reaction products and (II) 94% of a trimethylsilyl endblocked polydimethylsiloxane fluid having a viscosity of 100 cs. These compositions were prepared by placing the siloxane flui in a beaker, stirring with a magnetic stirrer, adding the copolymeric reaction product slowly with an eyedropper, and continuing stirring until thoroughly mixed. The particular copolymeric reaction product used in the premix and the appearance of the resulting composition are set forth below.

| Premix | Copolymeric Reaction Product | Composition Appearance |
|--------|------------------------------|------------------------|
| (A)    | Example 2                    | Hazy                   |
| (B)    | Example 3                    | Clear                  |
| (C)    | Example 4                    | White or Opaque        |
| (D)    | Example 5                    | Hazy                   |
| (E)    | Example 6                    | Clear                  |

EXAMPLE 8

Thread finish compositions were prepared by weighing into 4 oz. bottles 30 parts of the premix compositions prepared in Example 7 plus 7.5 parts of a polyoxyethylene tallow amine (Trymeen TAM-8) and 12.5 parts of a glycerol monostearate (Aldo MS-4). This mixture was heated in a 70° C. oven until melted, then stirred at high speed on a propeller mixer. The homogeneous mixture was then poured into new 4 oz. heated bottles and allowed to solidify at room temperature. These compositions were then aged overnight in a 70° C. oven and characterized.

It is noted that these compositions consist essentially of (I) about 3.6% of the copolymeric reaction product, (II) about 56.4% of the trimethylsilyl endblocked polydimethylsiloxane fluid, and (III) about 40% of the organic thread finishes.

The thread finish compositions made from premixes (A), (B) and (D) of Example 7 remained homogeneous after overnight heat aging. The composition prepared from premix (E) also remained homogeneous but was thick or more viscous, while the composition prepared from premix (C) exhibited slight separation.

EXAMPLE 9

Thread finish compositions were prepared by mixing 30 parts of the premix compositions of Example 7, 10 parts of a glycerol initiated polyoxypropylene having a molecular weight of about 4100 (Voronal CP4100), and 10 parts of stearic acid following the procedure of Example 8. The resulting compositions were aged overnight and characterized as in Example 8.

The thread finish compositions made with premixes (A) and (B) of Example 7 remained homogeneous after overnight heat aging. Compositions made from premixes (D) and (E) also remained homogeneous but were thick. The composition prepared from premix (C) showed about 20% clear solution at the bottom of the bottle.

EXAMPLE 10

Thread finish compositions were prepared by mixing in an Eppenbach mixer 60 parts of the premix compositions of Example 7, 35 parts of tris (2,3-dibromopropyl)-phosphate (Firemaster T23P) and 5 parts of a polyethylene glycol having an average molecular weight of 400 and a viscosity of 90 cs. (Dow Polyglycol E400).

Of the resulting thread finish emulsion compositions those made from premixes (A), (B) and (D) of Example 7 had a particle size of about 1 micron, the emulsion from premix (E) had a particle size of about 0.5 to 1 micron, and the emulsion from premix (C) had a particle size in the 2 to 4 micron range.

EXAMPLE 11

Seven thread finish compositions were prepared for purposes of evaluation. These compositions were made by first preparing a premix of ingredients (I) and (II) following the procedure of Example 7. Then the final emulsion compositions were prepared using an Eppenbach mixer, heating first when necessary to 70° C. to melt the components.

Composition (1) consisted essentially of (I) about 3.6% of the copolymeric reaction product of Example 1, (II) about 56.4% of a trimethylsilyl endblocked polydimethylsiloxane fluid having a viscosity of about 100 cs., and (III) about 15% of a polyoxyethylene tallow amine (Trymeen TAM) and about 25% of glycerol monostearate (Aldo MS).

Composition (2) was identical to (1) except that the copolymeric reaction product (I) used was that of Example 6.

Composition (3) was identical to (1) except that the copolymeric reaction product (I) consisted essentially of (A) about 90 percent of a resin consisting essentially of about 53 mole percent $SiO_2$ units and about 47 mole percent $(CH_3)_3SiO_{1/2}$ units, and (B) about 10 percent of a resin consisting essentially of 67 mole percent $CH_3SiO_{3/2}$ units and about 33 mole percent $C_6H_5SiO_{3/2}$ units.

Composition (4) was identical to (1) except that copolymeric reaction product (I) consisted essentially of (A) about 90 percent of a resin consisting essentially of about 53 mole percent $SiO_2$ units and about 47 mole percent $(CH_3)_3SiO_{1/2}$ units, and (B) about 10 percent of a resin consisting essentially of about 35.8 mole percent $CH_3SiO_{3/2}$ units, about 31.4 mole percent $C_6H_5SiO_{3/2}$ units, about 26.2 mole percent $C_6H_5(CH_3)SiO$ units and about 6.6 mole percent $(C_6H_5)_2SiO$ units.

Composition (5) was identical to (1) except that the copolymeric reaction product (I) used was that of Example 3.

Composition (6) was identical to (1) except that the organic thread finish (III) used was 40% of a polyoxyethylene tallow amine (Trymeen TAM-8).

Composition (7) consisted essentially of (I) about 3.27% of the copolymeric reaction product of Example 1, (II) about 51.21% of a trimethylsilyl endblocked polydimethylsiloxane fluid having a viscosity of about 100 cs., and (III) about 45.52% organic thread finishes as follows: about 25.44% of tris(2,3-dibromopropyl)-phosphate (Firemaster T23P), about 4.08% of a polyethylene glycol having an average molecular weight of 400 and a viscosity of 90 cs. (Dow Polyglycol E400), about 6% of a monostearate ester of a polyethylene glycol having an average molecular weight of about 400 (PEG 400 MS), and about 10% of glycerol monostearate (Aldo MS).

Solutions of the above thread finishes in 1,1,1-trichloroethane (Chlorothene) were prepared (by mixing about 2 g. of thread finish with about 186 g. of Chlorothene) and applied to 30/3 spun polyester thread by syringe using the Atlab finish applicator. These solutions were designed to deposit a 2% finish level (solids add-on) on the thread samples. The thus prepared thread samples were evaluated for sewability, static and frictional characteristics. The sewing tests were done at maximum sewing speed (6000 stitches/minute), at 60 g. tension, on layers of 50/50 cotton/polyester fabric. Static and frictional characteristics were checked on an Atlab fiber tester at 100 m/minute over a No. 2 pin (60 micro inches roughness), at a 180° contact, 10 g. of pretension, at 72° F. and 65% relative humidity. The test results are set forth in the following table.

| Thread Finish | Layers Sewable | Coefficient of Friction[1] | Static Attentuation[2] |
|---|---|---|---|
| None | 0 | 0.33 | 20 |
| DC 200 Fluid, 100 cs.[3] | 4 | 0.26 | 200 |
| Composition (1) | 4 | 0.28 | 200 |
| Composition (2) | 4 | 0.29 | 100 |
| Composition (3) | 4 | 0.28 | 200 |
| Composition (4) | 4 | 0.28 | 5 |
| Composition (5) | 3 | 0.28 | 5 |
| Composition (6) | 3 | 0.29 | 5 |
| Composition (7) | 3 | 0.26 | 5 |

[1] $\mu$ Friction
[2] Amplified ten times.
[3] Trimethylsilyl endblocked polydimethylsiloxane.

That which is claimed is:
1. A composition which consists essentially of
   (I) 2.5 to 10 percent by weight of a copolymeric reaction product of
      (A) 60 to 95 percent by weight of a resin consisting essentially of 45 to 72 mole percent $SiO_2$ units and 28 to 55 mole percent $(CH_3)_3SiO_{1/2}$ units, and
      (B) 5 to 40 percent by weight of a resin consisting essentially of 60 of 100 mole percent $RSiO_{3/2}$ units, 0 to 35 mole percent $R_2SiO$ units and 0 to 5 mole percent $R_3SiO_{1/2}$ units, each R radical being independently selected from the group consisting of the methyl, propyl and phenyl radicals, and (II) 90 to 97.5 percent by weight of a trimethylsilyl endblocked polydimethylsiloxane fluid.

2. A composition as defined in claim 1 which consists essentially of about 5 to 7 percent of (I) and about 93 to 95 percent of (II).

3. A composition as defined in claim 2 wherein (I) consists essentially of about 90% (A) and about 10% (B), and wherein (B) consists essentially of about 70 mole percent $C_6H_5SiO_{3/2}$ units and about 30 mole percent $C_3H_7SiO_{3/2}$ units.

4. A composition as defined in claim 2 wherein (I) consists essentially of about 85% (A) and about 15% (B), and wherein (B) consists essentially of about 70 mole percent $C_6H_5SiO_{3/2}$ units and about 30 mole percent $C_3H_7SiO_{3/2}$ units.

5. A composition as defined in claim 2 wherein (I) consists essentially of about 95% (A) and about 5% (B), and wherein (B) consists essentially of about 70 mole percent $C_6H_5SiO_{3/2}$ units and about 30 mole percent $C_3H_7SiO_{3/2}$ units.

6. A composition as defined in claim 2 wherein (I) consists essentially of about 60% (A) and about 40% (B), and wherein (B) consists essentially of about 47 mole percent $CH_3SiO_{3/2}$ units, about 23.5 mole percent $C_6H_5SiO_{3/2}$ units and about 29.5 mole percent $(C_6H_5)_2SiO$ units.

7. A composition as defined in claim 2 wherein (I) consists essentially of about 85% (A) and about 15% (B), and wherein (B) consists essentially of about 47 mole percent $CH_3SiO_{3/2}$ units, about 23.5 mole percent $C_6H_5SiO_{3/2}$ units and about 29.5 mole percent $(C_6H_5)_2SiO$ units.

8. A composition as defined in claim 2 wherein (I) consists essentially of about 90% (A) and about 10% (B), and wherein (B) consists essentially of about 88 mole percent $CH_3SiO_{3/2}$ units and about 12 mole percent $(CH_3)_2SiO$ units.

9. A composition as defined in claim 2 wherein (I) consists essentially of about 90% (A) and about 10% (B), and wherein (B) consists essentially of about 67 mole percent $CH_3SiO_{3/2}$ units and about 33 mole percent $C_6H_5SiO_{3/2}$ units.

10. A composition as defined in claim 2 wherein (I) consists essentially of about 90% (A) and about 10% (B), and wherein (B) consists essentially of about 35.8 mole percent $CH_3SiO_{3/2}$ units, about 31.4 mole percent $C_6H_5SiO_{3/2}$ units, about 26.2 mole percent $C_6H_5(CH_3)SiO$ units and about 6.6 mole percent $(C_6H_5)_2SiO$ units.

11. A copolymeric reaction product consisting essentially of (A) 60 to 95 percent by weight of a resin consisting essentially of 45 to 72 mole percent $SiO_2$ units and 28 to 55 mole percent $(CH_3)_3SiO_{1/2}$ units, and (B) 5 to 40 percent by weight of a resin consisting essentially of 60 to 100 mole percent $RSiO_{3/2}$ units, 0 to 35 mole percent $R_2SiO$ units and 0 to 5 mole percent $R_3SiO_{1/2}$ units, each R radical being independently selected from the group consisting of the methyl, propyl and phenyl radicals.

12. A copolymeric reaction product as defined in claim 11 wherein (B) consists essentially of 100 mole percent $RSiO_{3/2}$ units.

13. A copolymeric reaction product as defined in claim 12 consisting essentially of about 90% (A) and about 10% (B), and wherein (B) consists essentially of about 70 mole percent $C_6H_5SiO_{3/2}$ units and about 30 mole percent $C_3H_7SiO_{3/2}$ units.

14. A copolymeric reaction product as defined in claim 12 consisting essentially of about 85% (A) and about 15% (B), and wherein (B) consists essentially of about 70 mole percent $C_6H_5SiO_{3/2}$ units and about 30 mole percent $C_3H_7SiO_{3/2}$ units.

15. A copolymeric reaction product as defined in claim 12 consisting essentially of about 95% (A) and about 5% (B), and wherein (B) consists essentially of about 70 mole percent $C_6H_5SiO_{3/2}$ units and about 30 mole percent $C_3H_7SiO_{3/2}$ units.

16. A copolymeric reaction product as defined in claim 11 consisting essentially of about 60% (A) and about 40% (B), and wherein (B) consists essentially of about 47 mole percent $CH_3SiO_{3/2}$ units, about 23.5 mole percent $C_6H_5SiO_{3/2}$ units and about 29.5 mole percent $(C_6H_5)_2SiO$ units.

17. A copolymeric reaction product as defined in claim 11 consisting essentially of about 85% (A) and about 15% (B), and wherein (B) consists essentially of about 47 mole percent $CH_3SiO_{3/2}$ units, about 23.5 mole percent $C_6H_5SiO_{3/2}$ units and about 29.5 mole percent $(C_6H_5)_2SiO$ units.

18. A copolymeric reaction product as defined in claim 11 consisting essentially of about 90% (A) and about 10% (B), and wherein (B) consists essentially of about 88 mole percent $CH_3SiO_{3/2}$ units and about 12 mole percent $(CH_3)_2SiO$ units.

19. A copolymeric reaction product was defined in claim 12 consisting essentially of about 90% (A) and about 10% (B), and wherein (B) consists essentially of about 67 mole percent $CH_3SiO_{3/2}$ units and about 33 mole percent $C_6H_5SiO_{3/2}$ units.

20. A copolymeric reaction product as defined in claim 11 consisting essentially of about 90% (A) and about 10% (B), and wherein (B) consists essentially of about 35.8 mole percent $CH_3SiO_{3/2}$ units, about 31.4 mole percent $C_6H_5SiO_{3/2}$ units, about 26.2 mole percent $C_6H_5(CH_3)SiO$ units and about 6.6 mole percent $(C_6H_5)_2SiO$ units.

* * * * *

UNITED STATES PATENT AND TRADEMARK OFFICE
CERTIFICATE OF CORRECTION

PATENT NO. : 4,087,478
DATED : May 2, 1978
INVENTOR(S) : JOSEPH W. KEIL

It is certified that error appears in the above-identified patent and that said Letters Patent are hereby corrected as shown below:

Column 2, line 34, "as" should read --are--.

Column 4, line 39, "flui" should read --fluid--.

Column 8, line 45, "was" should read --as--.

Signed and Sealed this

Twenty-sixth Day of December 1978

[SEAL]

Attest:

RUTH C. MASON
*Attesting Officer*

DONALD W. BANNER
*Commissioner of Patents and Trademarks*